United States Patent Office 3,038,949
Patented June 12, 1962

3,038,949
VULCANIZATION OF LATEX WITH
4,4′-DITHIODIMORPHOLINE
Everett V. Anderson, Bethany, Conn., assignor to United
States Rubber Company, New York, N.Y., a corporation of New Jersey
No Drawing. Filed May 1, 1959, Ser. No. 810,220
1 Claim. (Cl. 260—776)

This invention relates to a method of making vulcanized natural rubber latex, using 4,4′-dithiodimorpholine as the vulcanizing agent, as well as to the improved vulcanized latex thereby obtained.

The invention has for its object the preparation of a vulcanized natural rubber latex compound suitable for dipping, spreading, spraying, etc., applications. A principal advantage of the invention resides in the fact that rubber deposited from the latex of the invention is remarkably resistant to certain types of aging.

Schidrowitz (U.S. Patent 1,443,149, issued January 23, 1923) first showed it possible to vulcanize the individual rubber particles in latex by subjecting the latex containing sulfur and compounding ingredients to heat and pressure. On depositing the rubber by coagulation or other means from such a latex and drying, a vulcanized rubber film is obtained without the necessity of further heating of the rubber.

The value of a vulcanized latex for use in certain applications using latex was immediately recognized. This is particularly true in latex dipping where such articles as rubber gloves, toy balloons and the like are manufactured. These articles are made by dipping a suitably shaped form in the latex and depositing the rubber thereon. In this application, the use of vulcanized latex gives the following advantages: (1) It eliminates the necessity of vulcanization and vulcanizing equipment; (2) It permits stripping of rubber articles from the form without distortion before complete removal of water thus releasing the forms early for re-use; and, (3) It eliminates the tendency of rubber to "blister" or "blow" during processing from the formation of expanding water vapor within the rubber.

While the advantages of using a vulcanized latex are self-evident, there are certain disadvantages inherent in the use of conventionally vulcanized latex, and such disadvantages have been a serious impediment to the more widespread use of vulcanized latex. These disadvantages are related to the fact that rubber obtained from such a latex is not as resistant to certain types of aging, particularly light aging, as normal latex vulcanizates made by deposition of unvulcanized latex, followed by vulcanization. These disadvantages have existed for many years, in spite of continuing efforts by those skilled in the art to improve the latex vulcanizates.

I have now found, unexpectedly, that natural rubber latex can be vulcanized with 4,4′-dithiodimorpholine, and I have further found, most surprisingly, that the latex vulcanized with this chemical is superior to conventional vulcanized latex, particularly from the standpoint of the aging qualities of products produced from the present latex.

The invention is applicable to natural (Hevea) rubber in latex form, whether such latex is a natural latex, or an artificial latex made by dispersing solid natural rubber in an aqueous medium in accordance with known practices. The term "natural rubber latex" as used herein therefore includes such artificial dispersions of natural rubber.

In accordance with the invention, I generally employ from 0.5 part to 2 parts of 4,4′-dithiodimorpholine per 100 parts by weight of rubber in the latex. For balloon stocks the preferred amount is 0.75 part, while for other vulcanized latex applications the preferred amount is 1.5 parts. The conventional low-temperature accelerators usually employed in latex vulcanization are used to accelerate the present vulcanizing process. Such low temperature or ultra-accelerators of sulfur vulcanization are frequently derived by reaction of carbon disulfide with secondary amines or alcohols. Examples are the metal dialkyl dithiocarbamates, xanthates, etc. Further examples are given in "Chemistry and Technology of Rubber," Davis and Blake, pages 302–303, and "Vanderbilt Rubber Handbook," 1958, pages 160–162. They may be used in the usual conventional amounts, e.g., from about 0.2 to 5 parts per 100 parts by weight of rubber in the latex. If desired, other compounding ingredients, such as further accelerators, antioxidants, etc., may be present in the latex. The thus-compounded latex is vulcanizable under the same conditions as conventional vulcanizable latex. In general, temperatures ranging from room temperature to about 70° C. are usually used. The time required for the vulcanization will of course be inversely related to the temperature (and will depend as well on other variables such as the concentration of vulcanizing agent and the kind and concentration of accelerator) and usually ranges from as little as about four hours at the higher temperatures to as long as five to seven days at lower temperatures. It is frequently preferred to effect the vulcanization at a temperature of from about 50° to 60° C. for a period of from about 16 to 24 hours.

The present process overcomes certain difficulties and disadvantages inherent in conventional vulcanization of latex. Thus, a major difficulty in conventional vulcanized latex arises from the fact that the amount of combined sulfur must be carefully controlled. At low combined sulfur content the rubber tends to assume the properties of unvulcanized rubber with lower tensile strength, higher permanent set, lower resistance to solvents, etc. On the other hand, at higher sulfur content, the cohesion between the individual particles on deposition is adversely affected. In order to keep the level of combined sulfur at the optimum point in conventional practice it is necessary to carefully limit the amount of sulfur used in vulcanizing the latex. Because ultra-accelerators are used in present day latex vulcanization, there is no satisfactory means of controlling the amount of combined sulfur unless very low levels of sulfur are used. Consequently, in conventional vulcanized latices available prior to the present invention we have compositions containing relatively low levels of sulfur when considered in the light of normal vulcanizates. Low levels of sulfur, in turn, result in low states of cure, or cross-linking of the rubber. Such rubbers unfortunately retain some of the properties of unvulcanized rubber, notably the tendency to deteriorate in sunlight. Therein lies the main disadvantage of conventional vulcanized latex, namely, poor resistance to sunlight. As can be realized such a deficiency becomes important where the rubber goods may be exposed to strong sunlight in service. Such articles as beach balls and balloons fall into this category. The use of 4,4'-dithiodimorpholine in accordance with the invention most unexpectedly yields a vulcanizate which is remarkably resistant to deterioration upon exposure to sunlight, in contrast to the conventional latex vulcanizates.

Another important advantage of the present invention resides in the fact that it is not necessary to employ zinc oxide when the rubber latex is vulcanized with 4,4'-dithiodimorpholine. Zinc oxide is an undesirable but necessary ingredient in conventional vulcanizable latex compositions. It is undesirable because its destabilizing action on the latex ultimately causes partial or complete coagulation. It is necessary to use zinc oxide in conventional practice because of its activating effect on the conventional vulcanization reaction. Sulfur vulcanization of rubber in the absence of zinc oxide is practicable only if certain zinc salts of organic vulcanization accelerators are used. Such accelerators fall in the class of zinc salts of dialkyl dithiocarbamates alone or in combination with the zinc salt of mercaptobenzothiazole. Sulfur vulcanization with such accelerators in the absence of zinc oxide, however, unfortunately gives vulcanizates which are much more susceptible to deterioration from heat, oxygen and light. In contrast, I have found that if 4,4'-dithiodimorpholine is employed in vulcanizing the latex, the susceptibility of the vulcanizate to such deterioration is avoided even if zinc oxide is not used. The compositions of the invention devoid of zinc oxide are therefore especially preferred, as avoiding the compounding difficulties associated with zinc oxide, while still providing a product that is remarkably improved from the standpoint of aging.

Another important advantage of the invention resides in the fact that the presently employed 4,4'-dithiodimorpholine is non-discoloring in latex. This, coupled with the remarkable effectiveness of 4,4'-dithiodimorpholine as a vulcanizing agent for latex at low temperatures, renders the invention outstandingly useful and advantageous. The latex vulcanized by the present method is stable, and can be fabricated into useful articles having highly desirable physical properties.

The following examples, in which the quantities of ingredients are stated as parts by weight, will serve to illustrate the practice of the invention in more detail.

*Example I*

To demonstrate the improved properties of the present 4,4'-dithiodimorpholine-vulcanized latex versus conventionally vulcanized latex, the following compounds were prepared:

| | A | B |
|---|---|---|
| Rubber (as latex) | 100.00 | 100.00 |
| Potassium Hydroxide | 0.25 | 0.25 |
| Anionic surfactant (e.g., sodium dibutyl napthalene sulfonate) | 0.5 | 0.5 |
| Formaldehyde | (¹) | (¹) |
| Antioxidant [e.g., 2,2'-methylene bis (4-methyl-6-tertiary-butyl phenol)] | 1.0 | 1.0 |
| Zinc diethyldithiocarbamate | 0.5 | 0.5 |
| Zinc mercaptobenzothiazole | 0.5 | 0.5 |
| Zinc oxide | 0.25 | 0.25 |
| Sulfur | 0.2 | |
| 4,4'-dithiodimorpholine | | 0.75 |

¹ Sufficient to reduce ammonia content of latex to 0.15%.

These compounds were made by masterbatching up to and including the zinc oxide. The masterbatch was then divided and sulfur added to A and 4,4'-dithiodimorpholine to B. All compounding materials were added as solutions or water-ground pastes in the normal manner for latex compounding.

On completion of compounding both were brought to a temperature of 55–60° C. and maintained at that temperature for 24 hours to vulcanize. At the end of this period they were allowed to cool to room temperature.

Test films of A and B were obtained by dipping on aluminum test plates using 25% calcium nitrate tetrahydrate dissolved in denatured alcohol as a coagulant. Coagulated films were then leached 45 minutes in hot tap water (60° C.) to remove residual calcium nitrate and then dried 30 minutes in an air oven at 100° C. Test data on these films are as follows:

UNAGED

| | Stress at 500% Elongation, Pounds Per Sq. Inch | Tensile Strength at Break, Pounds Per Square Inch | Elongation At Break, Percent |
|---|---|---|---|
| A (Sulfur) | 270 | 4,840 | 990 |
| B (4,4'-dithiodimorpholine) | 340 | 4,910 | 957 |

Light Aged:  Hours to failure under sun lamp
A (Sulfur) _____ 147.0
B (4,4'-dithiodimorpholine) _____ 191.5

The accelerated light aging test was conducted by dieing out ⅛" dumbbell specimens and stretching them to their elastic limit. The specimens were held in this stretched condition under a 275 watt sun lamp placed 11" above them. The number of hours the samples withstood this treatment before breaking was taken as their comparative resistance to light.

The preceding figures show clearly that vulcanization of the latex with 4,4'-dithiodimorpholine in accordance with the invention gives a film whose unaged physical properties are excellent. In addition, the latex film produced by the method of the invention displays remarkably improved resistance to light deterioration.

*Example II*

The purpose of this example is to demonstrate the advantages with respect to aging of using 4,4'-dithiodimorpholine in the absence of zinc oxide.

The identical compounds as disclosed in Example I were made up with the exception that zinc oxide was omitted from both compounds. The same vulcanizing conditions were given the compounds and test films were obtained in the same way as previously outlined.

Test data on these films are as follows:

UNAGED

| | Stress at 500% Elongation, Pounds Per Square Inch | Tensile Strength at Break, Pounds Per Square Inch | Elongation at Break, Percent | Percent of Original Tensile Retained |
|---|---|---|---|---|
| C (Sulfur) | 165 | 4,150 | 1,040 | |
| D (4,4'-dithiodimorpholine) | 285 | 4,550 | 967 | |

AGED 10 DAYS IN OXYGEN BOMB

| | | | | |
|---|---|---|---|---|
| C (Sulfur) | 130 | 2,240 | 945 | 54.0 |
| D (4,4'-dithiodimorpholine) | 235 | 4,025 | 923 | 88.5 |

HEAT AGED 24 HOURS AT 100° C. IN CIRCULATING AIR OVEN

| | | | | |
|---|---|---|---|---|
| C (Sulfur) | 150 | 2,460 | 905 | 59.3 |
| D (4,4'-dithiodimorpholine) | 295 | 4,350 | 923 | 95.5 |

Light Aged:  Hours to failure under sun lamp
C (Sulfur) _____ 79.0
D (4,4'-dithiodimorpholine) _____ 100.0

These data clearly indicate the superior aging obtained when 4,4'-dithiodimorpholine is used to vulcanize the latex in the absence of zinc oxide, in comparison to the poor aging of a conventional latex vulcanizate prepared in the absence of zinc oxide.

Having thus described my invention, what I claim and desire to protect by Letters Patent is:

A method of vulcanizing natural rubber latex comprising adding to said latex from 0.5 part to 2 parts of 4,4'-dithiodimorpholine as the sole vulcanizing agent per 100 parts by weight of rubber in the latex, the resulting latex being zinc-oxide-free, and thereafter subjecting the latex to a temperature of from 50° to 60° C. for a period of from 16 to 24 hours, the resulting zinc-oxide-free vulcanized latex being characterized by the fact that a rubber article deposited therefrom is highly resistant to deterioration from exposure to sunlight.

References Cited in the file of this patent

UNITED STATES PATENTS

| | | |
|---|---|---|
| 1,918,328 | Fisher | July 18, 1933 |
| 2,325,735 | Blake | Aug. 3, 1943 |
| 2,343,524 | Blake | Mar. 7, 1944 |
| 2,747,005 | Zerbe | May 22, 1956 |

FOREIGN PATENTS

| | | |
|---|---|---|
| 567,172 | Canada | Dec. 9, 1958 |